L. BACH, F. ROEGER AND E. KUEBLER.
EXPANSIBLE COVER.
APPLICATION FILED APR. 2, 1919.

1,322,863.

Patented Nov. 25, 1919.
2 SHEETS—SHEET 1.

Inventors
Leopold Bach
Fred Roeger
Elias Kuebler

By Frederick Myers
Their Attorney

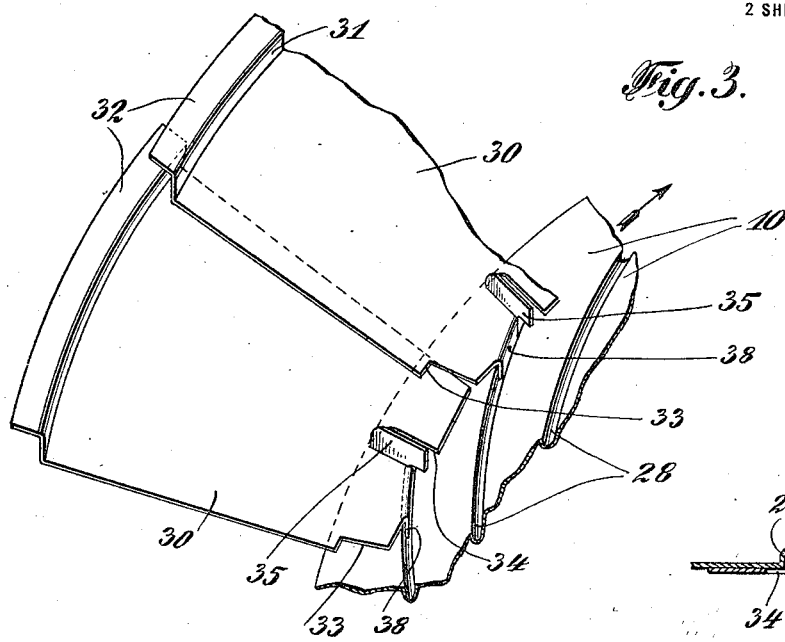
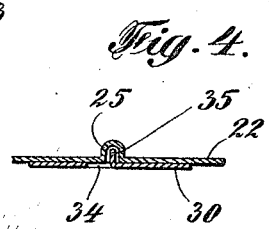
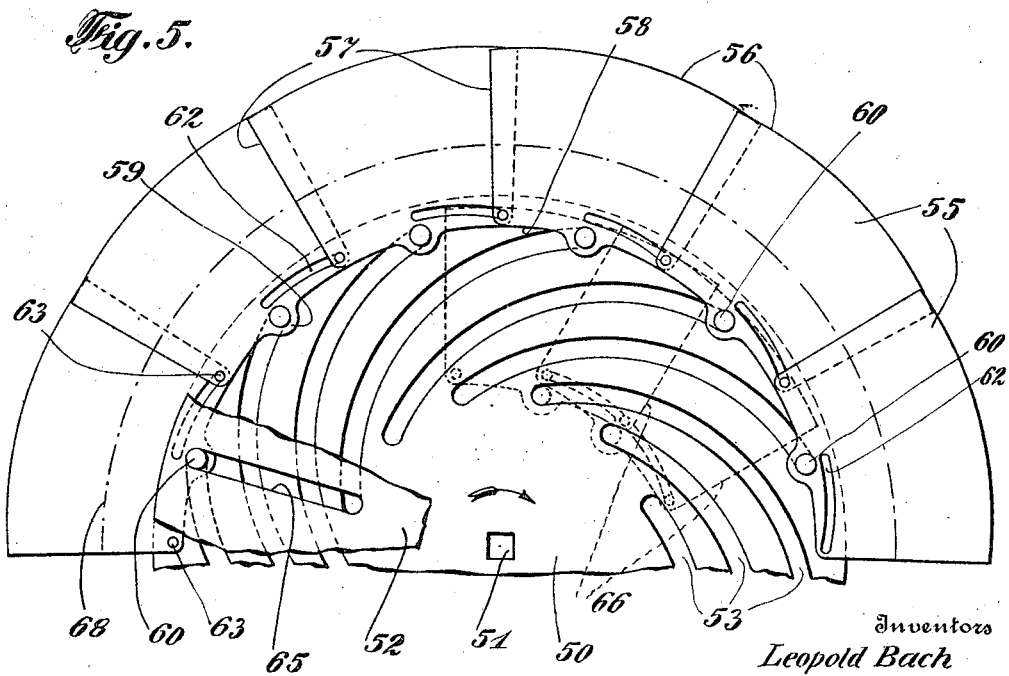

UNITED STATES PATENT OFFICE.

LEOPOLD BACH, FREDERICK ROEGER, AND ELIAS KUEBLER, OF NEW YORK, N. Y.,
ASSIGNORS TO AUTOMATIC EXPANSION CO., INC., A CORPORATION OF NEW YORK.

EXPANSIBLE COVER.

1,322,863.     Specification of Letters Patent.     Patented Nov. 25, 1919.

Application filed April 2, 1919. Serial No. 286,927.

*To all whom it may concern:*

Be it known that we, LEOPOLD BACH, a citizen of the United States, residing in New York, county of Bronx and State of New York, and FREDERICK ROEGER, a citizen of Germany, residing in New York, county of New York and State of New York, and ELIAS KUEBLER, a citizen of Germany, residing in New York, county of New York and State of New York, have invented new and useful Improvements in Expansible Covers, of which the following is a specification.

This invention relates to improvements in expansible covers used in connection with cooking vessels.

The principal object of the invention is to provide a cover which by reason of its expansible features may be easily and quickly adjusted to suit pots and pans varying in their diameters, so as to avoid the use of a multiplicity of rigid covers.

A further object is to provide a cover having a double central portion by which the operating knob is maintained in a relatively cool condition, the outer segmental elements of the cover overlapping in the manner of scales, preventing the passage of steam and odor from the foods being cooked.

These and other like objects are attained by the novel construction and combination of parts hereinafter described and shown in the accompanying drawings, forming a material part of this disclosure, and in which:—

Fig. 3 is an enlarged perspective view showing the connecting means between the center elements and segmental outer leaf elements.

Fig. 4 is an enlarged fragmentary sectional view taken on line 4—4 of Fig. 1, and Fig. 5 is a partial top plan view showing a modified form of cover construction.

Figure 1:
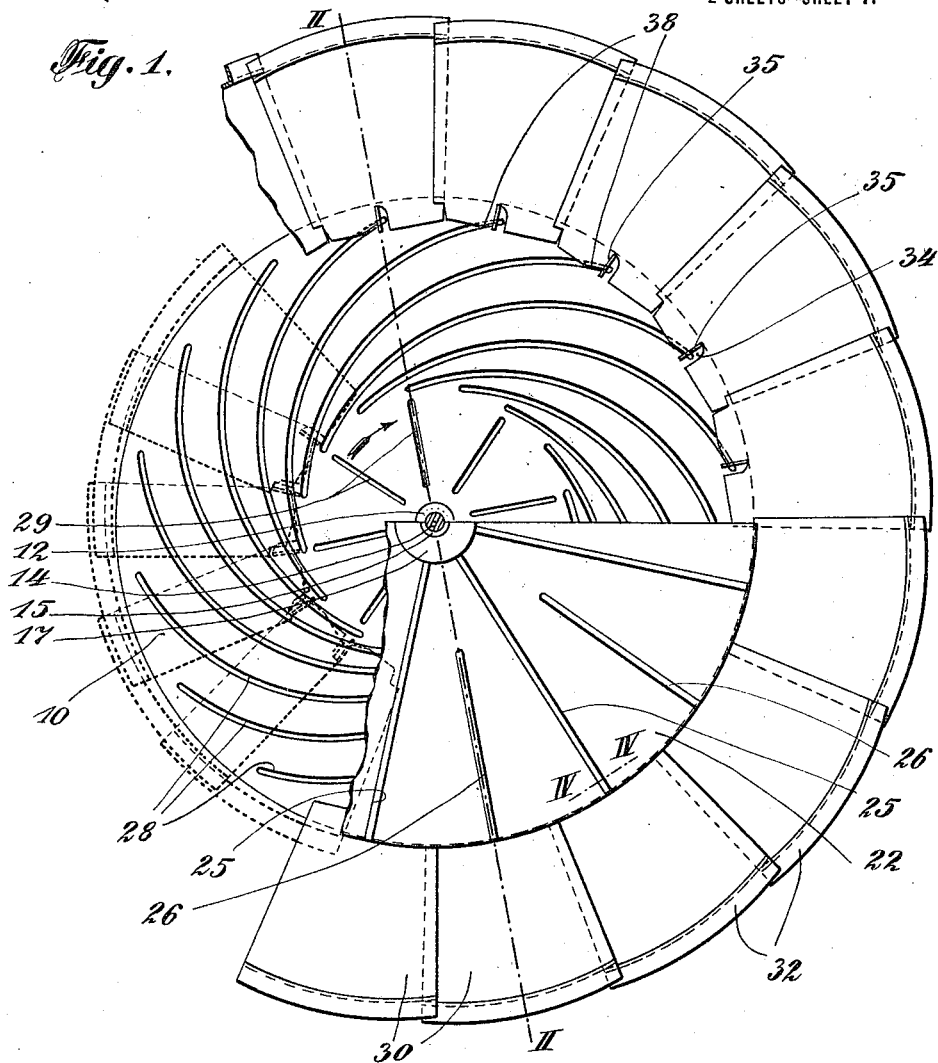
Figure 1 is a fragmentary plan view of a cover made in accordance with the invention, certain parts being omitted, and others being broken away in order to show the construction.
Figure 2:
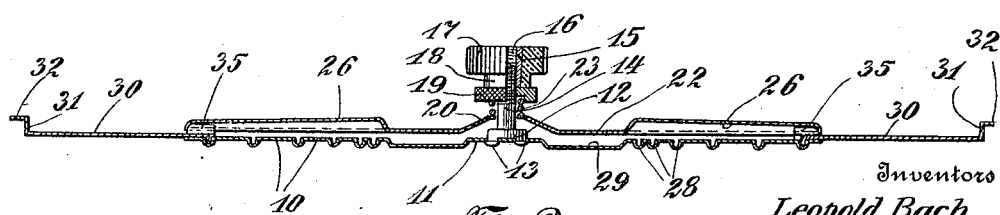
Fig. 2 is a transverse sectional view taken on line 2—2 of Fig. 1.

In the drawings, the numeral 10 indicates the bottom plate, preferably made of relatively thin sheet metal, as aluminum, its center 11 containing a pair of openings receptive of projections 13 extending from the head 12 of the screws 14, these projections being headed over in the manner of rivets, so as to rigidly maintain the cover in engagement with the head of the screw.

The body 14 of the screw terminates in a threaded portion 15, engageable in a threaded conical sleeve 16, rigidly secured within the corrugated head 17 of the operating knob, which has a reduced lower shoulder 18, adapted to make contact with the thin nut 19, threaded on the screw so as to hold the knob firmly engaged.

The body of the screw 14 passes through a central opening formed in the raised portion 20 of a cap plate 22, the same being equivalent in diameter to the bottom plate 10, against which it is normally pressed, due to the effect of a coiled compression spring 23, surrounding the screw 14, and abutting against the lower surface of the nut 19 at one end, and the raised portion of the plate 22 at its opposite end. Thus, as the head 12 is rigidly engaged in the bottom plate 10, the plates are pressed toward each other.

The plate 22 is formed with a plurality of oppositely disposed narrow radial recesses 25, extending from its periphery to the raised portion 20, while alternating therebetween are similar but shorter radial recesses 26.

Formed in the bottom plate 10 are a plurality of arcuately curved recesses 28, their outer ends beginning at points near the periphery of the bottom plate and extending inwardly, their radii being taken at points tangent to the center, as best seen in Fig. 1, while in order to strengthen the bottom plate, a plurality of radial recesses 29 are formed in its central portion as indicated.

A plurality of segmental shaped leaf plates 30, provided with raised elements 31, which terminate in flanged edges 32, which are formed to a radius equal to one half of the mean diameter of the cover. These leaf plates are arranged to overlap in the manner of the scales of a fish, forming relatively tight joints so as to prevent the passage of steam, gasses or the like, and are cut-away, as at 33, along one of their side edges, adjacent to their inner ends, for reasons which will farther on be apparent.

Each of the inner ends of the segmental leaves is sheared centrally, as at 34, providing upwardly turned lugs 35, which extend rearwardly and are adapted to engage in the radial recesses 25 and 26, respectively, so as to guide the leaves as they are moved toward or from the center. A portion of the inner ends of the leaves are bent to form curved projections 38 conforming with the curvature of the arcuate recesses 28, of the bottom plate into which they enter sufficiently to be guided therein, and when the segmental leaves 30 are in an innermost, retracted position, as indicated in the broken lines in Fig. 1, the purpose of the cut-out portions 33 will be evident, they serving to receive the radial projections 35, while the curved projections 38, engaged in the recesses 28, are caused to move the segmental plates in or out, by rotating the bottom plate 10 with respect to the upper plate 22, this being accomplished by rotating the knob 17, attached to the lower plate, while the spring 23 serves to clamp the top and bottom plates together, securing the segmental leaves 30 closely therebetween.

In the modification shown in Fig. 5, a similar construction is used, the same comprising a bottom plate 50 having a square central opening 51 receivable of a suitably shaped knob whereby the plate may be rotated, and which is overlaid by an upper plate 52, through which the operating knob passes in an obvious manner.

Formed in the lower plate 50 are a plurality of curved open slots 53 formed in the manner previously indicated, their radii being tangential to the center of the plate, while their ends extend nearly to the periphery. The segments or leaves 55 are formed with curved outer edges 56 and straight side edges 57, while their inner, narrow ends 58 have projections 59 at their centers, containing double headed pins 60, adapted to pass through the curved slots 53 and are held in place therein by the heads.

Formed through each of the leaves 55 are arcuate open slots 62, the same extending from one corner of the leaves toward their center, while fixed in the opposite corners are pins 63 passing through the guide slots 62. One of the pins 60 is extended upward so as to engage in the single slot 65, formed in the cover plate 52, the slot being formed radially and acting as a guide for the pin, and, as all of the several segmental leaves are connected by the inter-engaging pins 63, in the slots 62, it will be obvious that they are all moved toward or from the center in unison, their inner positions being shown by the broken lines 66 in Fig. 5, while the broken lines 68 indicates the central or medium position of the leaves, in which position the curved outer edges 56 form a complete true circle.

From the foregoing it will be obvious that upon turning the knob in either form of the cover indicated, the bottom plate will be turned with respect to the upper or outer cover plate, such turning causing the segmental leaves to move in or out from the center so as to expand or retract the operative diameter of the cover in a clearly apparent manner.

It will also be seen that, due to the overlapping features of the segmental leaves, all emanations from the foods cooked within the vessel is prevented from rising. It will also be clear that the covers may be adjusted within the range of action for which they are designed without the use of any tools whatever, by merely turning the knobs and holding the upper plates stationary.

It will be understood that while the device has been described as for a cover for pots, pans, kettles, or the like it may be used for other purposes where an expanding plate element is desired.

Having thus described our invention what we claim as new and desire to secure by Letters Patent, is:—

1. An expansible plate comprising upper and lower circular plates, a plurality of overlapping symmetrical segmental leaves engaged between said plates, a knob operatively combined with the lower of said plates whereby it may be turned with reference to the other plate, and operative means formed with said plates whereby said leaves may be moved toward or from the center uniformly.

2. An expansible plate comprising upper and lower circular plates, means for rotating one of said plates relative to the other, an annular row of overlapping segmental leaves engaged between said upper and lower plates, inter-engaging connections between the inner edges of said leaves and said plates whereby they may be moved to or from the center when said plates are turned relatively, and means for guiding said segmental leaves so as to move in radial lines.

3. In an expansible cover plate, the combination with a lower circular plate having a plurality of arcuate recesses, the radii of said recesses being tangent to the center of said plate, an upper plate, rotatable connections between said upper and lower plates, a plurality of radial recesses formed in said upper plate, a circumjacent row of segmental plate leaves engaged between said upper and lower plates, projections extending from the inner edge of said segmental leaves into said arcuate recesses, projections extending upward from the inner ends of said leaves engageable in said radial recesses, and means for rotating said upper and lower plates relatively whereby said segmental leaves are moved to or from the center.

4. A cover plate comprising a pair of thin circular metallic plates, a knob passing through the upper of said plates rigidly engaged in the lower plate, a plurality of segmental metallic leaves engaged in each of the outer edges of said upper and lower plate, cam grooves formed in the lower of said plates, extensions from said segmental leaves enterable in said cam grooves, radial grooves formed in the upper plate, extensions from said segmental plates adapted to be guided in said radial grooves, and means for rotating said upper and lower plates whereby said segmental leaves are uniformly expanded or contracted.

5. In a cover plate, the combination with a lower circular metallic plate having a plurality of arcuate slots formed therein, the radii of said slots being tangential to the center of said plate, an upper plate, a knob passing through said upper plate rigidly engaged with said lower plate, a plurality of segmental plate leaves engaged between the upper and lower plates, connections between the adjacent corners of said segmental leaves, whereby they are caused to move uniformly toward and from each other, and means for guiding said leaves so as to move radially with respect to the center of said plates.

In testimony whereof we have signed our names to this specification.

LEOPOLD BACH.
FREDERICK ROEGER.
ELIAS KUEBLER.